US012637880B2

(12) United States Patent
Bouchard

(10) Patent No.: US 12,637,880 B2
(45) Date of Patent: May 26, 2026

(54) LOCKABLE COUPLING DEVICE

(71) Applicant: TECHNOLOGIES CGC INC.,
Quebec (CA)

(72) Inventor: Carl Bouchard, Quebec (CA)

(73) Assignee: TECHNOLOGIES CGC INC.,
Quebec (CA)

( * ) Notice: Subject to any disclaimer, the term of this
patent is extended or adjusted under 35
U.S.C. 154(b) by 739 days.

(21) Appl. No.: 17/475,135

(22) Filed: Sep. 14, 2021

(65) Prior Publication Data

US 2022/0081934 A1      Mar. 17, 2022

Related U.S. Application Data

(60) Provisional application No. 63/078,021, filed on Sep.
14, 2020.

(51) Int. Cl.
  *E05B 73/00*      (2006.01)
  *G06F 21/32*      (2013.01)
(52) U.S. Cl.
  CPC .......... *E05B 73/00* (2013.01); *E05B 73/0082*
          (2013.01); *G06F 21/32* (2013.01)
(58) Field of Classification Search
  CPC ....... E05B 73/00; E05B 73/0082; G06F 21/32
  USPC ................................................. 248/551, 553
  See application file for complete search history.

(56) References Cited

U.S. PATENT DOCUMENTS 4,305,266 A * 12/1981 Lockwood .......... E05B 73/0082
                                                248/553
4,511,158 A      4/1985 Varga et al.

5,152,486 A      10/1992 Kabanek et al.
5,362,021 A      11/1994 Phillips
7,502,226 B2 *   3/2009 Searby ................... F16M 13/02
                                                361/679.41
9,145,715 B2 *   9/2015 Carnevali ............... E05B 37/00
                        (Continued)

FOREIGN PATENT DOCUMENTS

DE      102017110001 A1    11/2018

OTHER PUBLICATIONS

Translation of Schaub et al. (DE-102017110001-A1). (Year: 2025).*

*Primary Examiner* — Jonathan Liu
*Assistant Examiner* — Guang H Guan
(74) *Attorney, Agent, or Firm* — BCF LLP

(57)      ABSTRACT

A lockable coupling device comprising: a base member
releasably connectable to a release member by interen-
gageble portions, the base and release members configurable
between coupled and release configurations; a coupling
mechanism for permitting actuation between the coupled
and release configurations, and including an actuator opera-
tively connected to at least one of the interengageable
portions and moveable between a first state permitting
engagement of the interengagable portions in the coupled
configuration, and a second state releasing engagement of
the interengageable portions; a locking mechanism for lock-
ing and releasing the coupled configuration, the locking
mechanism comprising: an operator input portion opera-
tively connected to a latch portion and configured to: lock
the coupled position by causing the latch portion to engage
with the actuator to prevent the actuator moving from the
first state to the second state, and unlock the coupled
configuration by permitting movement of the actuator from
first to second position.

18 Claims, 12 Drawing Sheets

(56)                    References Cited

U.S. PATENT DOCUMENTS

| | | | |
|---|---|---|---|
| 9,746,125 B2 | 8/2017 | Bowman | |
| 10,130,753 B2 * | 11/2018 | Wolff | A61M 5/14 |
| 11,007,951 B1 | 5/2021 | Zarecky | |
| 11,203,886 B2 * | 12/2021 | Wu | E05B 73/0082 |
| 11,353,155 B2 * | 6/2022 | Bouchard | F16M 11/041 |
| 11,725,770 B2 * | 8/2023 | Bouchard | F16B 5/0657 |
| | | | 248/637 |
| 12,295,756 B2 * | 5/2025 | Bouchard | A61B 50/26 |
| 12,326,218 B2 * | 6/2025 | Bouchard | F16M 13/022 |
| 12,350,201 B2 * | 7/2025 | Bouchard | A61G 1/04 |
| 2002/0011543 A1 | 1/2002 | Chinn et al. | |
| 2003/0046764 A1 | 3/2003 | Smeed | |
| 2008/0217910 A1 | 9/2008 | Walke | |
| 2012/0262039 A1 | 10/2012 | Daugbjerg et al. | |
| 2014/0374564 A1 | 12/2014 | Schroeder et al. | |
| 2014/0374565 A1 | 12/2014 | Tan | |
| 2015/0041419 A1 | 2/2015 | Hasegawa | |
| 2015/0090849 A1 | 4/2015 | Breitweiser et al. | |
| 2015/0273138 A1 | 10/2015 | Wolff et al. | |
| 2016/0031382 A1 | 2/2016 | Chinn et al. | |
| 2016/0324701 A1 | 11/2016 | Cambridge et al. | |
| 2017/0209318 A1 | 7/2017 | Schroeder et al. | |
| 2020/0080346 A1 * | 3/2020 | Wu | E05B 73/0082 |
| 2022/0081934 A1 * | 3/2022 | Bouchard | F16M 11/22 |
| 2023/0366505 A1 * | 11/2023 | Bouchard | A61M 16/0003 |
| 2024/0108519 A1 * | 4/2024 | Bouchard | A61G 1/04 |
| 2025/0115074 A1 * | 4/2025 | Davis | F16M 13/02 |

* cited by examiner

50

14

12

26

28

56

54

50

14

52

LOCKABLE COUPLING DEVICE

TECHNICAL FIELD

The present technology relates to coupling devices, such as for releasably attaching two items, and which can be locked.

BACKGROUND

In certain situations, such as during provision of medical care, there can arise a need to releasably connect two items together. Coupling devices which permit quick attachment and quick release can be used to attach equipment to a support surface such as a wall or floor of an ambulance, or to a transportation device such as a stretcher.

There is a need for improved coupling devices in which a security limitation is provided to one or both of the quick attachment and quick release functions.

SUMMARY

Embodiments of the present technology have been developed based on inventors' appreciation that in some situations separation of two items from each other require some limitation of access. Inventors have appreciated that a security requirement to the attachment and/or detachment of members of a coupling device would be useful in certain situations such as during transportation of narcotics, medications, drugs, biohazards, valuable items, to name a few.

From one aspect, there is provided a lockable coupling device as described herein and/or defined in the claims and/or illustrated in the appended drawings.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF NON-LIMITING EMBODIMENT(S)

Reference will now be made in detail to various non-limiting embodiment(s) of a lockable coupling device. Embodiments of the lockable coupling device include, without limitation, uses in which one item is required to be locked in a coupled engagement with another item. For example, in certain embodiments, the lockable coupling device can be used to lockably attach a first type of item to a second type of item. In certain embodiments, the first type of item may comprise an item to which it is desired to limit access because of the item may prove harmful under certain circumstances (e.g. poisons, medications, biohazards, etc), or because of its value (e.g. expensive medical equipment, etc). The second type of item may be support surface, such as of a transportation device, including but not limited to a stretcher, a wheelchair, a portable bed, a portion of a vehicle such as an ambulance, a fire engine, an aircraft, a train, etc.

It should be understood that other non-limiting embodiment(s), modifications and equivalents will be evident to one of ordinary skill in the art in view of the non-limiting embodiment(s) disclosed herein and that these variants should be within scope of the appended claims. Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Broadly, according to non-limiting embodiments of the present technology, there is provided a lockable coupling device 10 for releasably coupling two units together in coupled and released configurations, and for locking the closed configuration such that it can only be unlocked, in order to separate the units for example, by input of a security key or a security code. One or both of the units may be arranged to be connected to an item such as a container for housing medications, a transport device etc. In this way, such items can be securely connected together.

Figure 1:
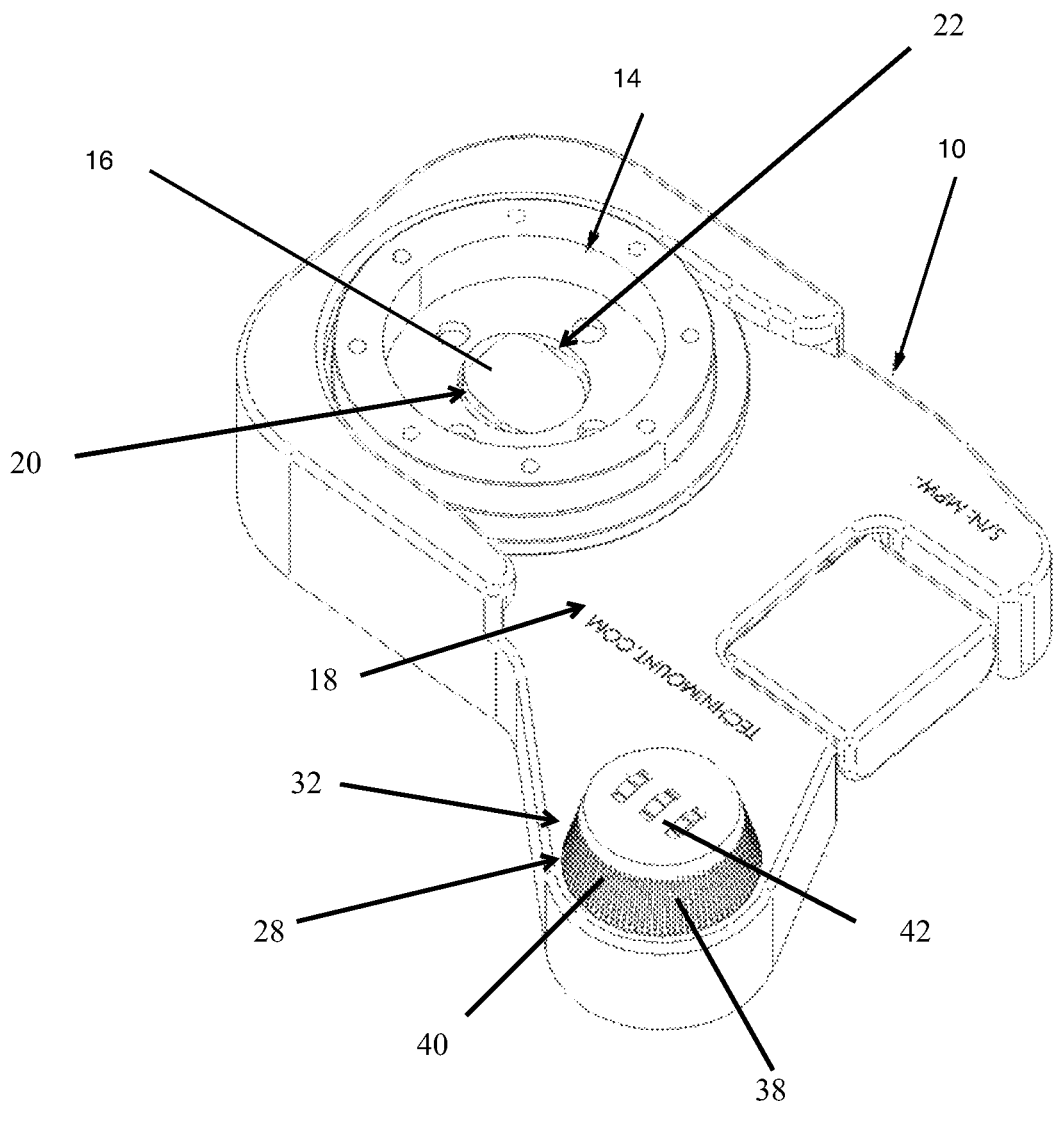
FIG. 1 is a perspective view from a front end of a lockable coupling device in which a release member is attached to a base member, according to certain embodiments of the present technology.
Figure 2:
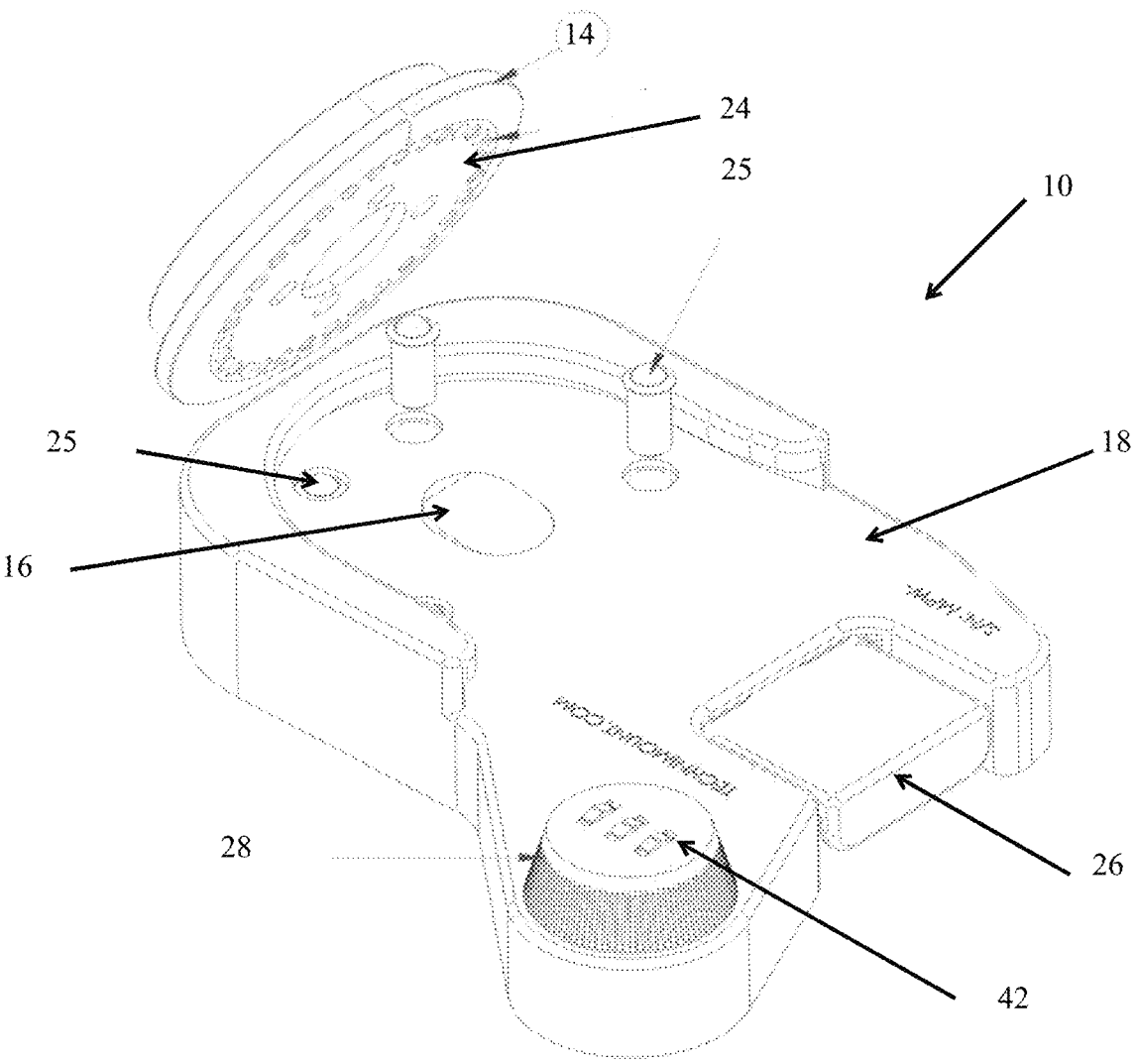
FIG. 2 is a perspective view of the lockable coupling device of FIG. 1 in which the release member is separated from the base member, according to certain embodiments of the present technology.
Figure 3:
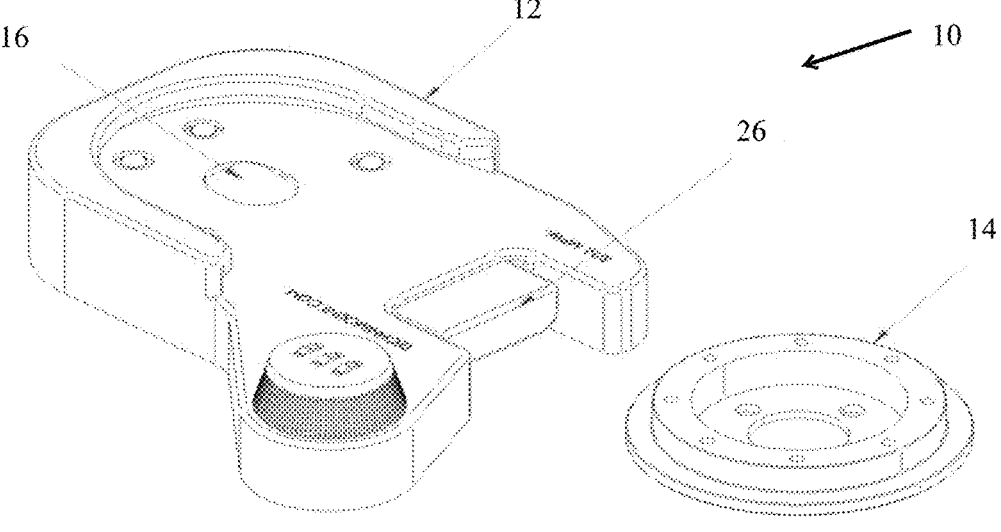
FIG. 3 is a perspective view from a front end of the lockable coupling device of FIG. 1 in which the release member is separated from the base member, according to certain embodiments of the present technology.
Figure 4:
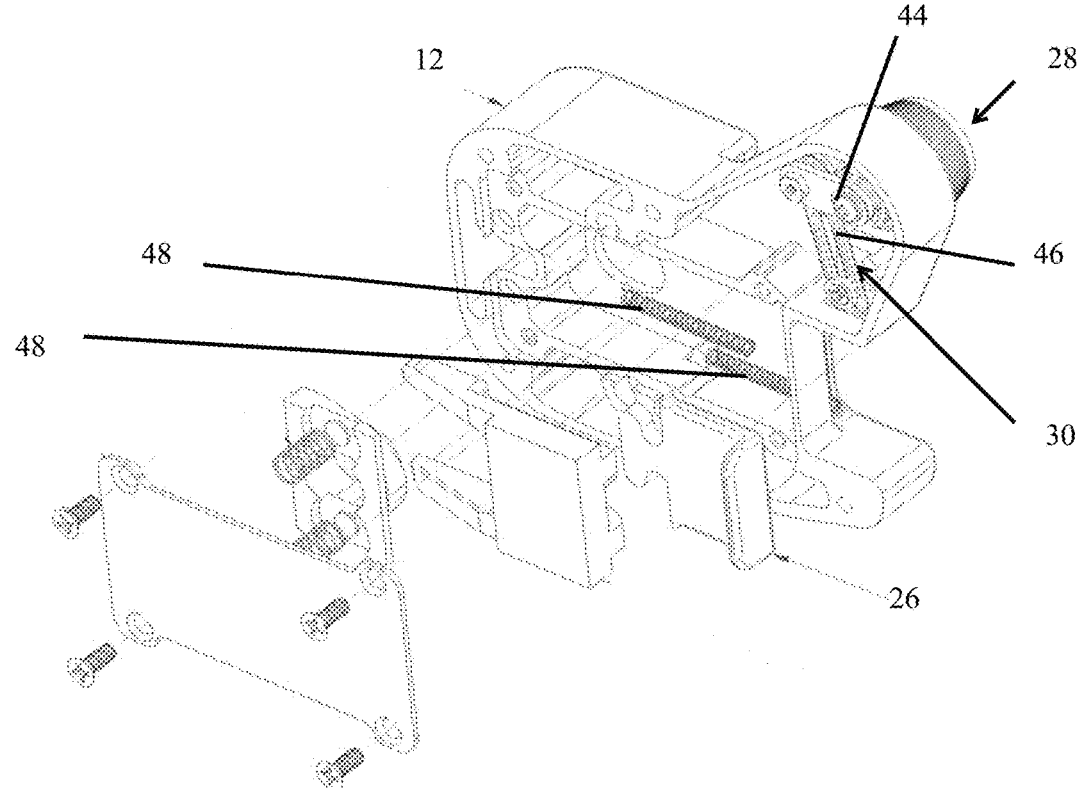
FIG. 4 is an exploded view from a back side of the lockable coupling device of FIG. 1, according to certain embodiments of the present technology.
Figure 5:
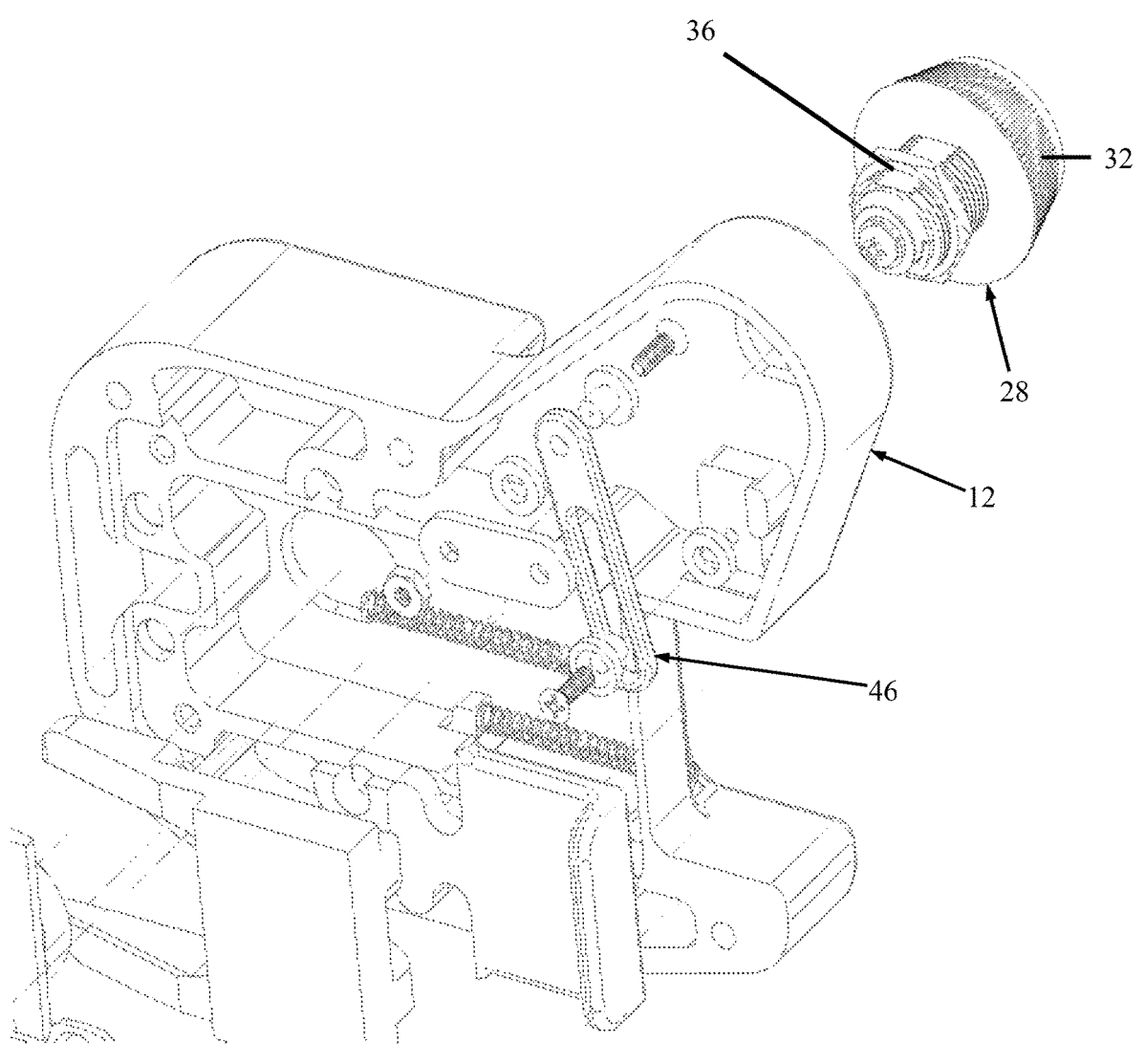
FIG. 5 is an exploded view from a back side of the lockable coupling device of FIG. 1, according to certain other embodiments of the present technology.

Referring initially to FIGS. 1-3, the lockable coupling device comprises a base member 12 and a release member 14 which are releasably connectable together by interengageable portions associated with each of the base member 12 and the release member 14 respectively. The base member 12 and the release member 14 are configurable between a coupled configuration (FIG. 1) and a release configuration (FIGS. 2 and 3). In the embodiment illustrated in FIGS. 1-3, the interengageable portion associated with the base member comprises a tongue member 16 extending from a front face 18 of the base member 12. The interengageable portion associated with the release member comprises a rim 20 of an opening 22 in a contact face 24 of the release member 14. In the coupled configuration, the tongue member 16 extends outwardly from the front face 18. In the released position, the tongue member 16 is retracted below the front face 18. The tongue member 16 is resiliently biased to extend from the front face 18 of the base member 12.

The release member 14 has a circular disk configuration, and the front face 18 of the base member 12 has a pocket-like configuration, defining the contact face 24, and configured to receive the release member 14 through an open end. The release member 14 and the base member 16 have respective planar contact portions, in which, in certain embodiments, ball bearings 25 may be provided to enable the release member 14 to be rotated within the pocket of the base member 12 (best seen in FIG. 2).

The lockable coupling device 10 also includes a coupling mechanism for permitting actuation between the coupled and release configurations. The coupling mechanism includes an actuator 26 operatively connected to at least one of the interengageable portions and moveable between a first state, configured to permit engagement of the interengagable portions in the coupled configuration, and a second state configured to release the engagement of the interengageable portions in the release configuration. In certain embodiments, the first state is a neutral state, and the second state comprises the actuator being pushed-in.

In the embodiment illustrated in FIGS. 1-3, the actuator is a button, and actuation of the button inwardly (towards the left side of the image as indicated by the arrow in FIG. 1) causes the tongue member 16 to retract and disengage with the rim 20 of release member 14 (release configuration). In the release configuration, the base member 12 and the release member 14 can be separated.

Also provided is a locking mechanism configurable to operably lock and release the coupled configuration. The locking mechanism comprises an operator input portion 28 operatively connected to a latch portion 30 (best seen in FIGS. 4-7). The locking mechanism is configured to lock the coupled position by causing the latch portion 30 to engage with the actuator 26 (FIG. 6) to prevent the actuator 26 moving from the first state (in which the interengageing portions of the base member 12 and the release member 14 are engaged) to the second state (in which the interengageing portions of the base member 12 and the release member 14 are disengaged). The locking mechanism is configured to unlock the coupled configuration by permitting movement of the actuator 26 from the first state to the second state.

In certain embodiments, the locking mechanism is configured to unlock the coupled configuration responsive to an input to the operator input portion 28 matching a predetermined input. In certain embodiments, the locking mechanism is configured to lock the coupled configuration responsive to an input to the operator input portion 28 matching a predetermined input.

The operator input portion 28 comprises a housing 32 on the front face 18 of the base member 12, and rotatable relative to the front face 18. The latch portion is on a back side 34 of the base member 12 and connected to the housing by a connector 36. The housing 32, in certain embodiments, is embodied as a knob. Other configurations are possible such as a switch, a lever, etc. Knurls 38 are provided along a side edge 40 to assist operator grip. The operator input portion 28 also includes a security interface 42 which is configured to obtain the input and/or the predetermined input. The input may be considered as a security code or a security key.

In the embodiment illustrated in the figures, the security interface comprises combination dials. The combination dials may be based on alphanumeric or numeric settings. In FIG. 2, the housing 32 is provided with three combination dials. However, more or less numbers of combination dials are within the scope of the present disclosure.

In other embodiments (not shown), the security interface may comprise buttons instead of combination dials.

In other embodiments (not shown), the security interface may comprise a touch screen for input of any kind which can be obtained through a touch screen.

In other embodiments (not shown), the security interface may comprise a keyhole and the input/predetermined input may be a key configured to fit the keyhole.

In other embodiments (now shown), the security interface is biometric based. The input and/or predetermined input may comprise a finger print, an iris scan, a face scan, or the like.

In other embodiments (now shown), the security interface comprises a sensor for detecting a signal (the input). The signal may include one or more of an optical signal, audio signal, a radiofrequency signal, an electromagnetic signal, temperature, and the like.

In any one or more of these embodiments of the security interface, the input and/or predetermined input may comprise one or more of numbers, letters, symbols, words, colours, biometric information, a physical key, and the like. The predetermined input may be provided in a manner known in the art. For example, in the case of the security interface comprising the combination dials, the combination of numbers, letters or symbols to be input into each dial may be pre-recorded or preprogrammed.

In certain embodiments, the operator input portion 28 is configured such that when the input matches the predetermined input, the housing 32 or a portion thereof, can be moved, to cause the latch portion 30 to move.

Figure 6:
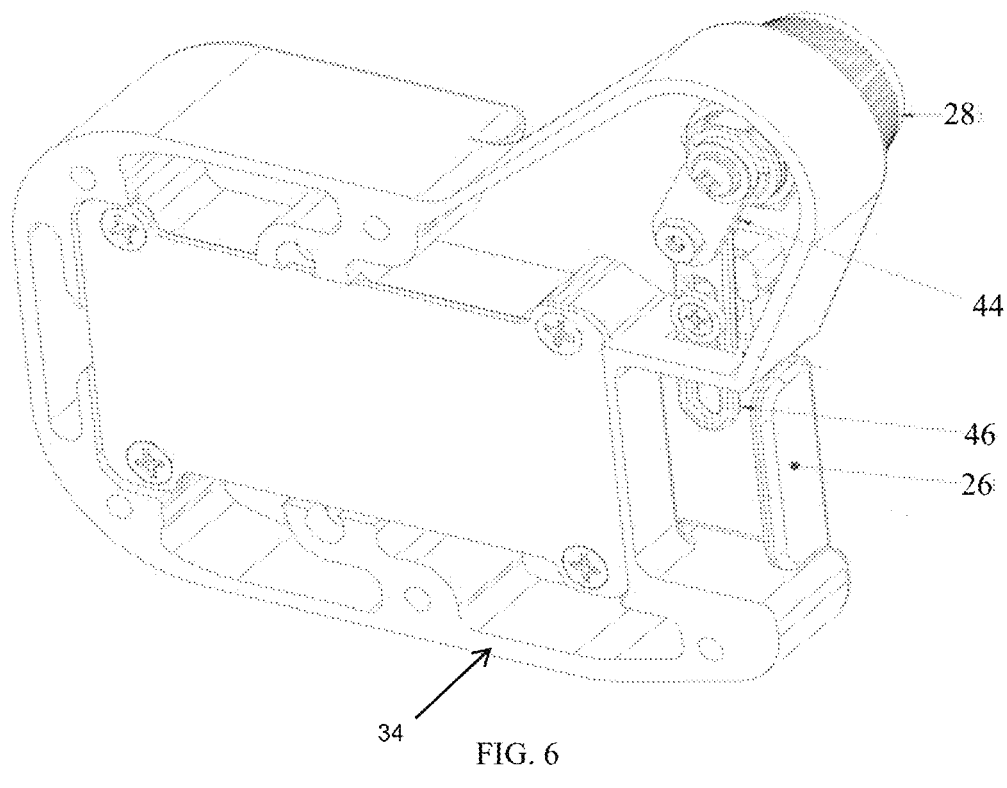
FIG. 6 is a view from the back side of the lockable coupling device of FIG. 1 in a locked configuration, according to certain embodiments of the present technology.
Figure 7:
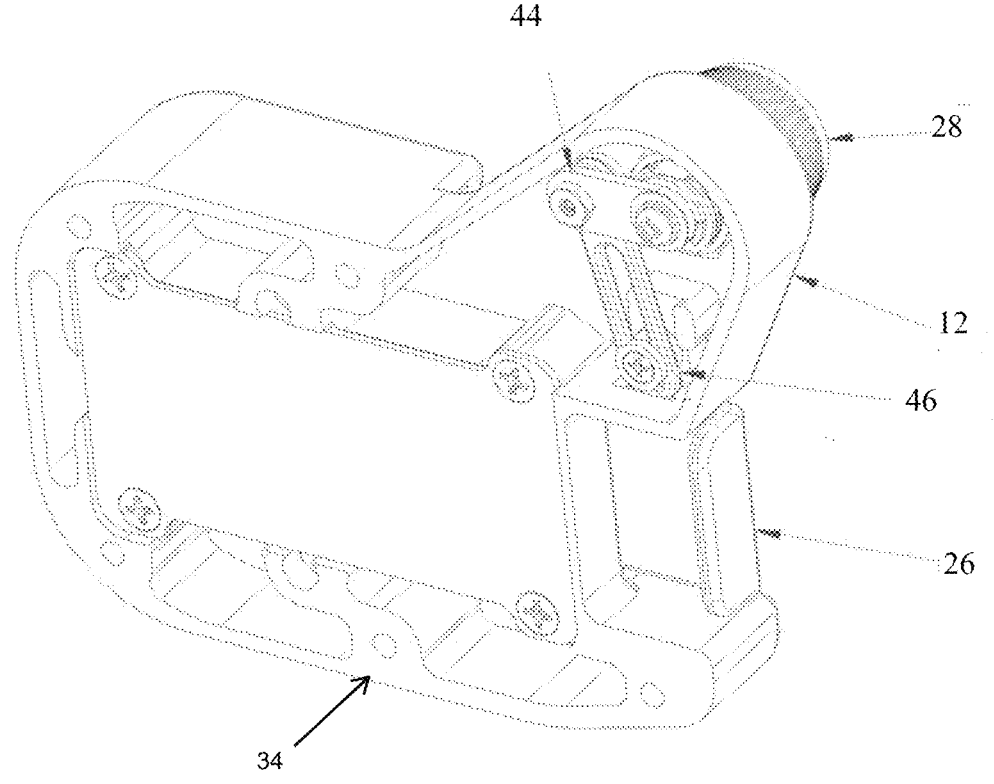
FIG. 7 is a view from the back side of the lockable coupling device of FIG. 1 in an unlocked configuration, according to certain embodiments of the present technology.

More specifically, and with reference to FIGS. 6 and 7, in certain embodiments, the latch portion 30 comprises a first arm 44 connected to the connector 36 at one end, and at another end connected to a second arm 46. Rotation of the housing 32 in an anticlockwise manner causes the first arm 44 to rotate in an anticlockwise direction and in doing so lift up the second arm 46 away from the actuator 26, such that the second arm 46 no longer interferes with movement of the actuator 25 between the first and second states. It can be seen that when the locking mechanism is locked, the second arm 46 protrudes in a manner to block movement of the actuator 26 to a fully compressed position. In certain embodiments, resilient members such as one or more springs may resiliently bias the locking mechanism to the locked position. In other embodiments (not shown), the latch portion 30 may be configured in a manner to unlock the locking mechanism from a clockwise movement of the housing 32.

Figure 8:
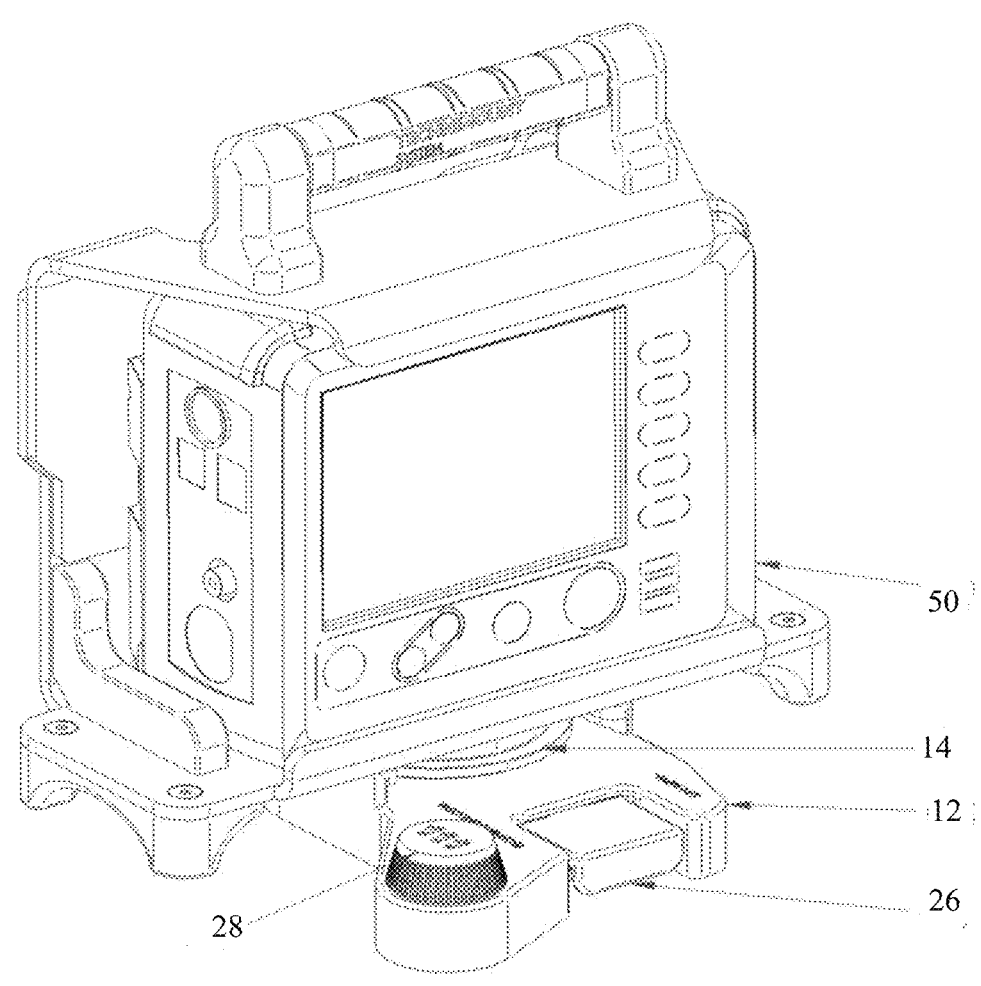
FIG. 8 is a perspective view of the lockable coupling device of FIG. 1 with the releasable member attached to a frame supporting medical equipment, according to certain embodiments of the present technology.
Figure 9:
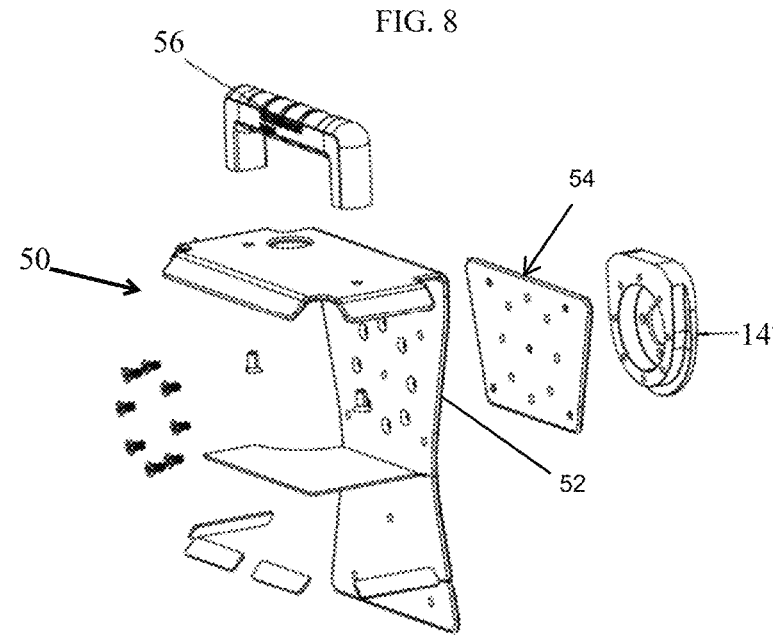
FIG. 9 is an exploded view of the frame of FIG. 8, according to certain embodiments of the present disclosure.

Referring now to FIGS. 8 and 9, the release member 14 of the lockable coupling device 10 is attached to a frame 50 for supporting equipment, such as medical equipment. The frame 50 has support members 52. An attachment plate 54 interfaces the release member 14 and one of the support members 52 to connect the release member to the frame 50. A handle 56 is provided extending from the frame 50 for ease of transportation of the frame. Although not shown, the base member 12 can be connected to something to which it is desired to mount the equipment. In some examples, the base member 12 is attached to a transportation device such as a stretcher, or a wall or a floor of a transportation device or room.

Figure 10:
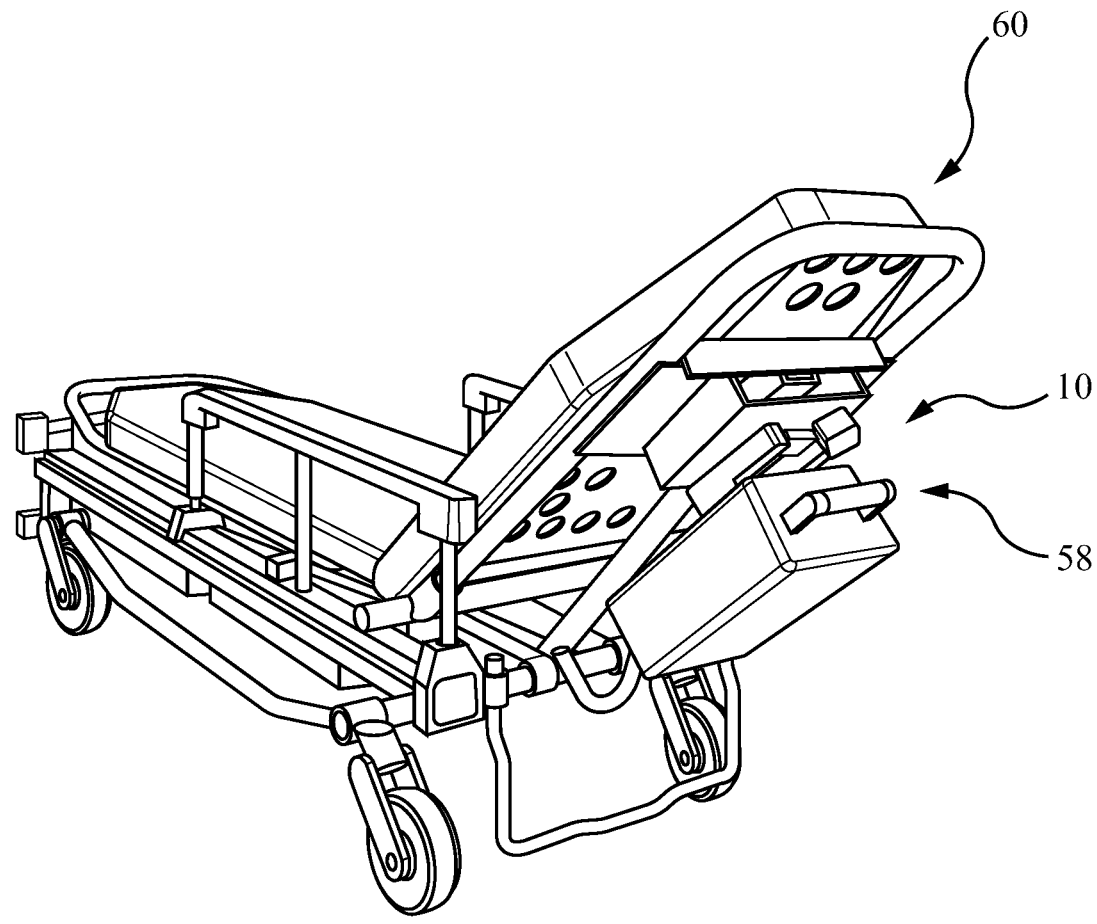
FIG. 10 is a perspective view of the lockable coupling device of FIG. 1 in which the base member is attached to a stretcher and the release member is attached to a box, according to certain embodiments of the present disclosure.

FIG. 10 shows another example of a use of the lockable coupling device 10, in which the release member 14 is attached to a box 58, and the base member 12 is attached to a stretcher 60. The box 58 may be used to house items which it is desired to keep secure, such as narcotics, medicines, poisons, and the like.

Advantageously, use of the lockable coupling device 10 in certain embodiments, permits the removable attachment of a first item attached to the release member 14 to a second item attached to the base member 12, in which a security key is needed to detach the first item from the second item.

Turning now to FIGS. 11-19 in which are illustrated embodiments of a base member 134 and a release member 136 to which the locking mechanism of the present technology may be applied.

The release member 136 has a body 138 which is plate-like and has a first side 140 and a second side 142. The first side 140 of the release member body 136 defines a planar contact face 144 for contacting the base member 134. The second side 142 of the release member 136 has a collar 146 extending therefrom, the collar 146 positioned inwardly of a perimeter 148 of the release member 136 to define a flange portion 150 of the release member 136.

The base member 134 has a front side 152 and a back side 154. The front side 152 has a planar contact portion 156 for contacting the contact face 144 of the release member 136. A shoulder 158 extends around a portion of a periphery 160 of the planar contact portion 156 to define a pocket 162 for receiving at least a portion of the release member 136. The shoulder 158 is engageable with a portion of the flange 150 of the release member 36 when the release member 136 is positioned on the base member 134.

The base member front side 152 has an open access end 164 through which the release member 136 can be slidingly inserted and removed from the pocket 162. As can be seen, the base member 134 is four-sided, with the shoulder 158 extending around three of the four sides and the fourth side being the open access end 164. In other embodiments, the base member 134 may have different numbers of sides.

Figures 11, 12:
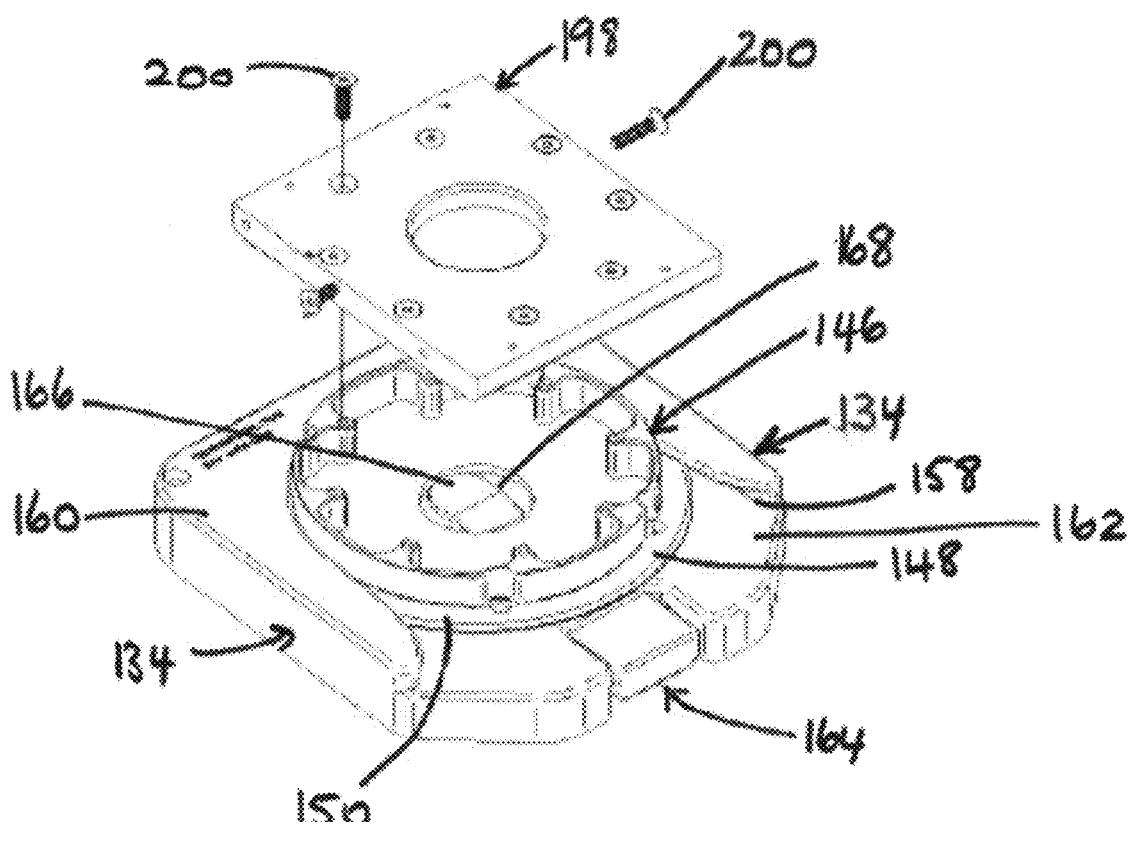
FIG. 11 is a coupling device comprising a base member, a release member, and a top plate, in which aspects of the present disclosure can be embodied, according to certain embodiments of the present disclosure.
FIG. 12 is the coupling device of FIG. 11, with the top plate removed for clarity and when in the uncoupled position, according to certain embodiments of the present disclosure.

A stop member 166 (also referred to as tongue member herein) is positioned in a recess 168 within the planar contact portion 156 of the base member 134 and is moveable relative to the planar contact portion 156. The stop member 166 is moveable to extend out of the recess 168 and to be housed fully in the recess 168 by a coupling lock mechanism 170 and an actuator 172. The stop member 166 is actuatable between a lock position (also referred to as first position) in which at least a portion of the stop member 166 extends from the recess 168 and a release position (also referred to as second position) in which the stop member 166 is retracted into the recess 168 and does not extend from the recess 168. In the lock position, when the base member 134 and the release member 136 are coupled together, the stop member 166 can abut an edge 174 of an opening 176 defined in the release member contact face 144 to delimit movement of the release member 36 towards the open access end 64 (FIG. 11). In the release position, the release member 136 can be decoupled from the base member 134 (FIG. 12).

Figure 13:
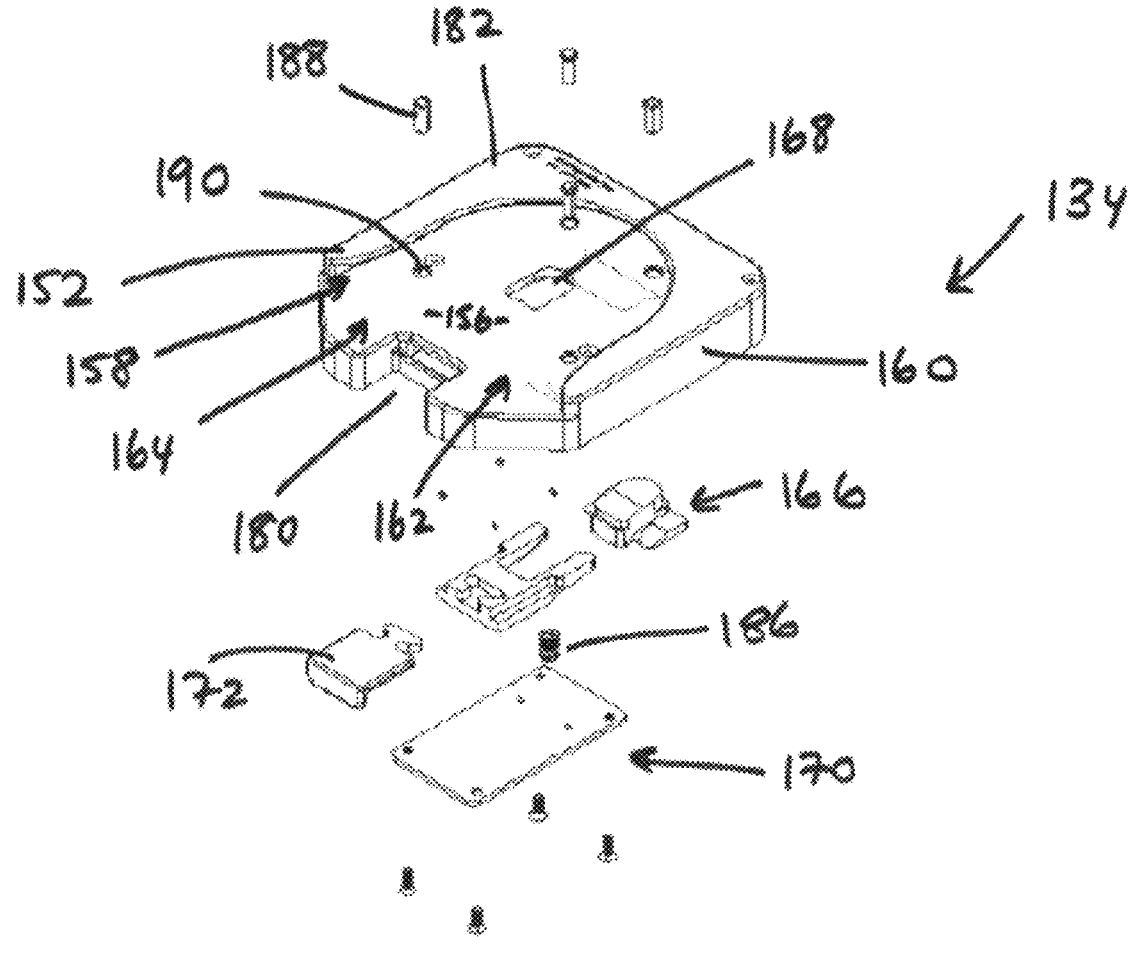
FIG. 13 is an exploded view of the base member of FIG. 11, according to certain embodiments of the present disclosure.
Figure 14:
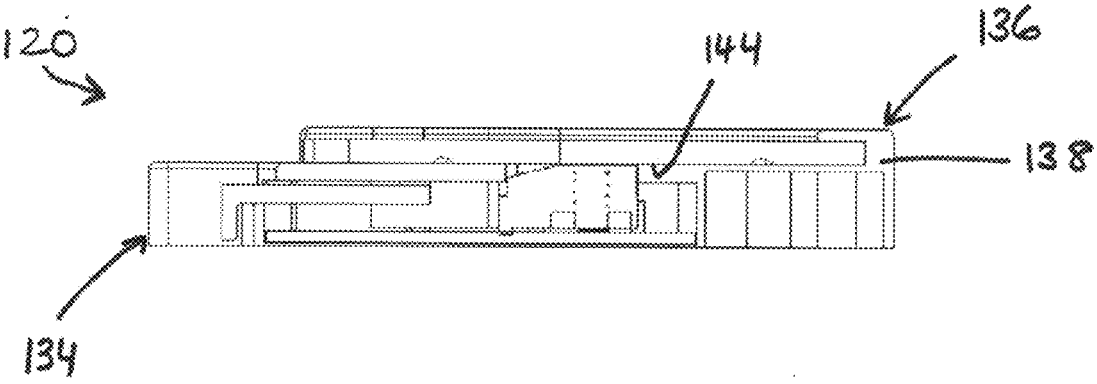
FIG. 14 is a cross-sectional view of the coupling device of FIG. 11, according to certain embodiments of the present disclosure.
Figure 15:
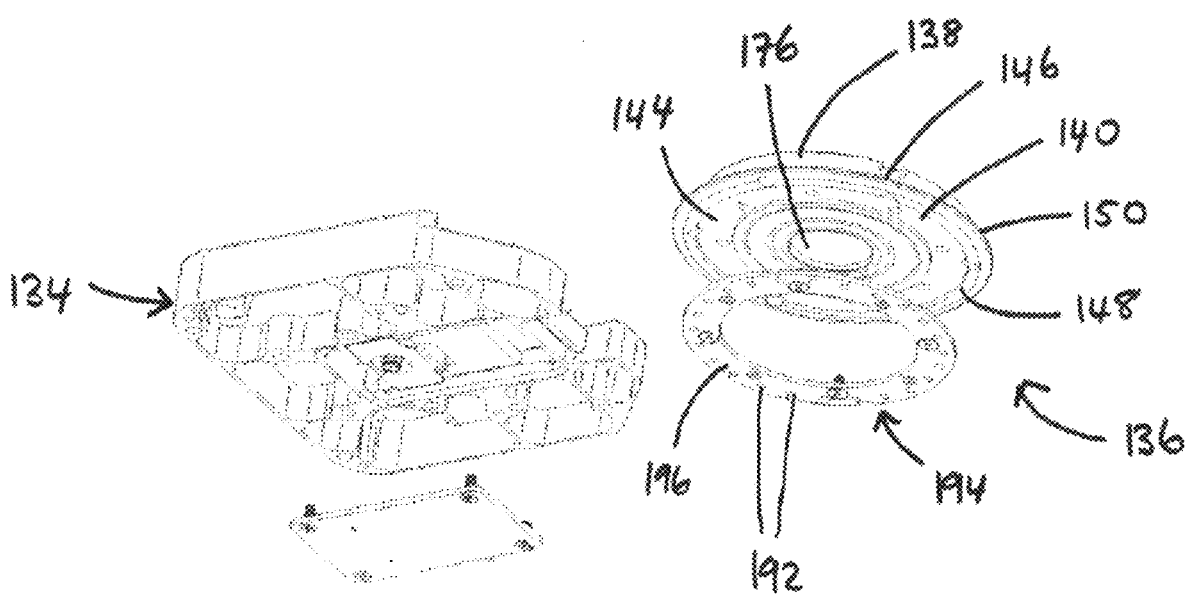
FIG. 15 is an exploded view of the base member and the release member of FIG. 11, according to certain embodiments of the present disclosure.

The actuator 172 is positioned at the open access end 164. The actuator 172 is a push button 178 housed within a groove 180 formed at the open access end 164. The actuator 172 can be moved between a neutral position (also referred to herein as a first state) and a deployed position (also referred to herein as a second state). When the actuator 172 is in the neutral position (FIG. 11), the stop member 166 is resiliently biased towards the lock position. As best seen in FIG. 13, when the actuator 172 is in the deployed position (pushed inwardly), the coupling lock mechanism 170 is arranged to move the stop member 166 to retract into the recess 168 in the release position. This can allow the release member 136 to be slid relative to the base member 134 and removed from the base member 134. In certain embodiments, the actuator 172 extends beyond a perimeter 182 of the base member 134 (FIG. 19) when in the neutral position. In other embodiments, the actuator 172 does not extend beyond the perimeter 182 of the base member 134 (FIGS. 11-12).

Figure 17:
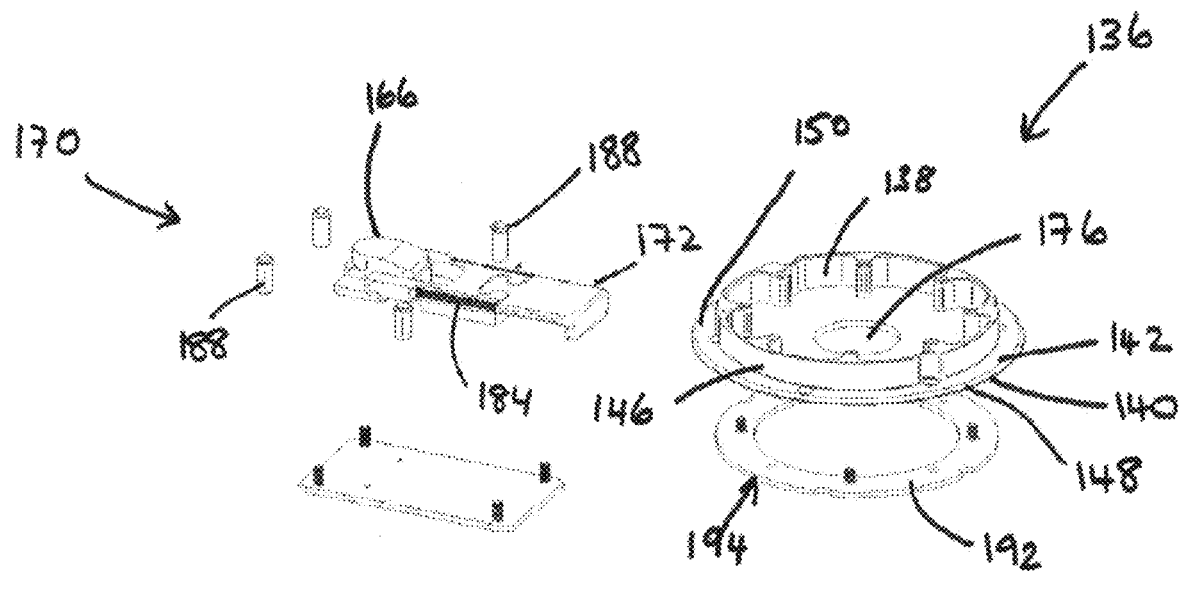
FIG. 17 is an exploded view of the release member of FIG. 11 and a lock mechanism, according to certain other embodiments of the present disclosure.
Figure 18:
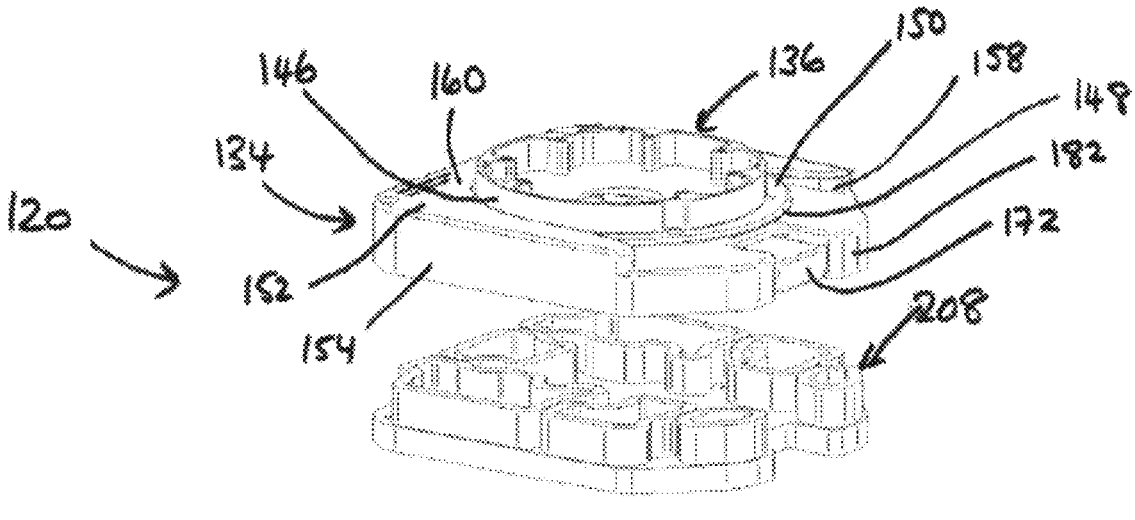
FIG. 18 is the base member of FIG. 11 and a damping member, according to certain embodiments of the present disclosure.

The coupling lock mechanism 170, best seen in FIGS. 13 and 17, comprises an actuator spring 184 resiliently biasing the actuator 172 outwardly to the neutral position, and a stop member spring 186 resiliently biasing the stop member 166 to the lock position. The actuator spring 184 and the stop member spring 186 extend in directions which are substantially transverse to one another.

The base member 134 comprises a plurality of spring loaded ball bearings 188 partially extending from recesses 190 formed in the planar contact portion 156 of the front side 152 of the base member 134 and engageable with corresponding recesses 192 defined in the planar contact face 144 of the release member 136. The spring loaded ball bearings 188 and the recesses 192 can guide the movement of the release member 136 relative to the base member 134.

Figure 16:
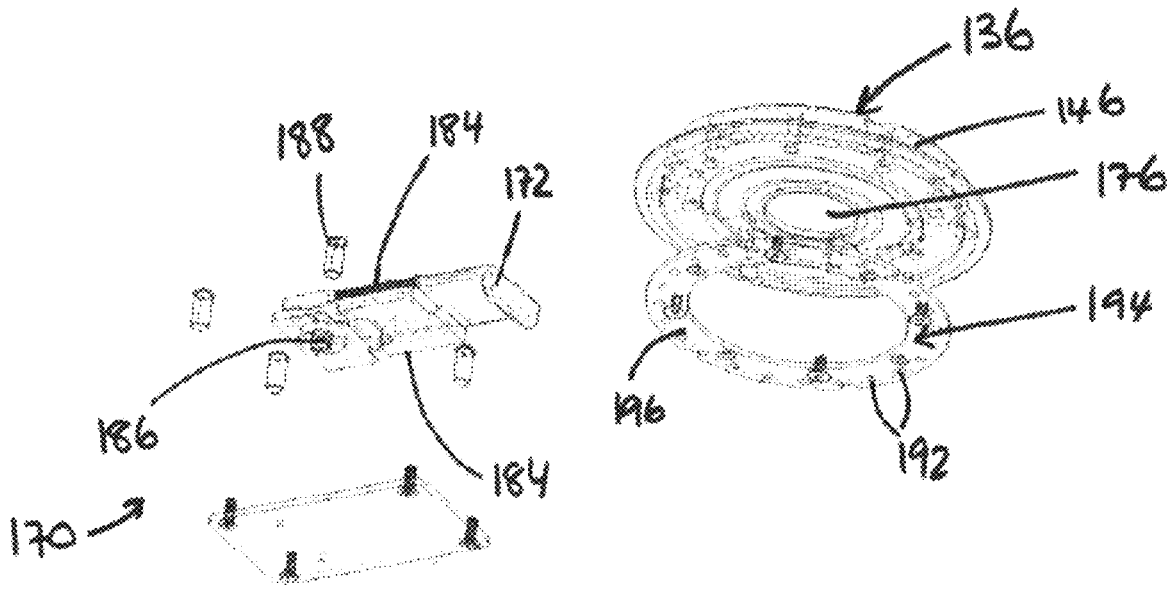
FIG. 16 is an exploded view of the release member of FIG. 11 and a lock mechanism, according to certain embodiments of the present disclosure.

In certain embodiments, the planar contact face 144 of the release member 136 comprises an anti-friction layer for reducing or minimizing friction between the contact faces 144, 156 of the release member 136 and the base member 134. As illustrated in FIGS. 16 and 17, the anti-friction layer comprises a disc 194 attached to the release member 136 and with an outer face 196 which is the planar contact face 144 and having anti-friction properties. In this embodiment, the recesses 192 for receiving the spring loaded ball bearings 188 are formed in the disc 194. In other embodiments, the anti-friction layer comprises a coating. The anti-friction layer may comprise any material that reduces friction between the base member 134 and the release member 136.

The coupling device 120 further comprises a top plate 198 attachable to the collar 146 of the release member 136 and attachable to the equipment 12. As best seen in FIG. 11, the top plate 198 is attached to the collar 146 by fasteners 200, such as screws. The top plate 198 has an opening formed therein.

In certain embodiments (for example as illustrated in FIGS. 11-18), when the base member 134 and the release member 136 are coupled together and in the lock position, the release member 136 is rotatable within the pocket 162 whilst maintaining the coupling. In this respect, the perimeter 148 of the plate-like body 138 of the release member 136 is circular in shape, the stop member 166 of the base member 134 is positioned substantially centrally of the planar contact portion 156, and the opening 176 of the release member 136 is positioned substantially centrally of the plate-like body 138, such that the release member 136 can be rotated within the pocket 162 when the stop member 166 is in the lock position. The stop member 166 can be considered to function also as a pivot point in these embodiments.

Figure 19:
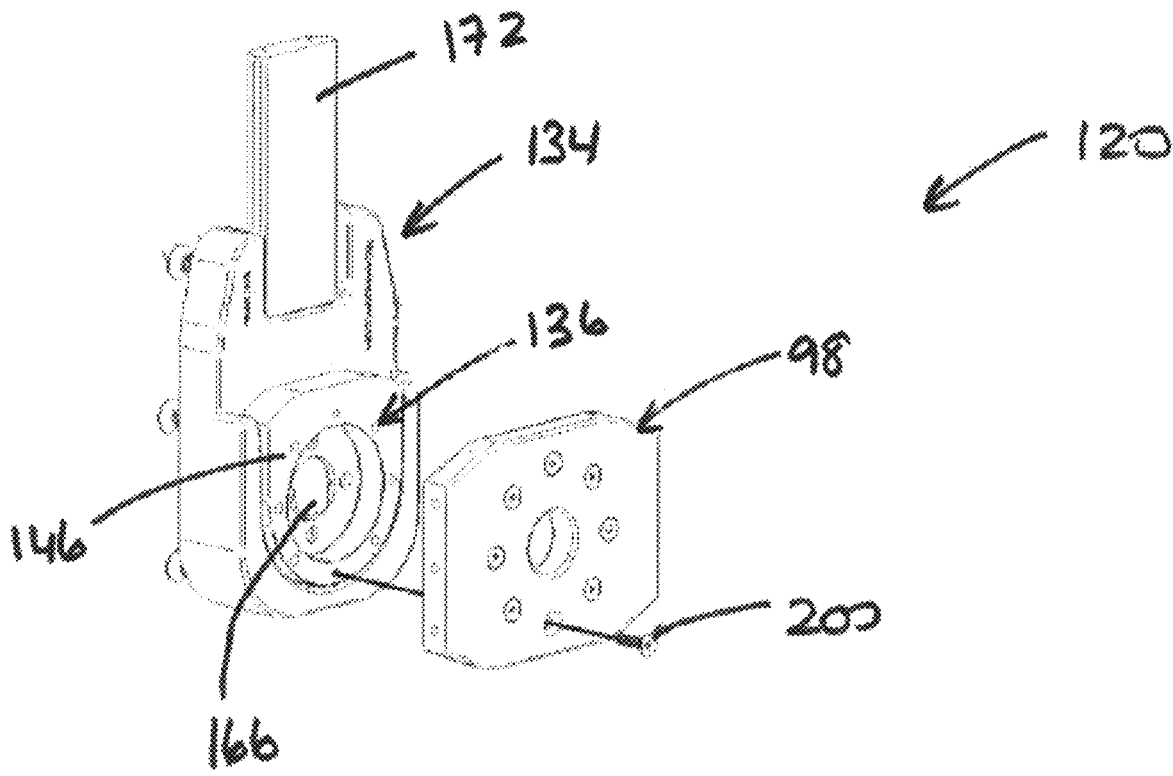
FIG. 19 is a coupling device comprising a base member, a release member, and a top plate in which aspects of the present technology can be embodied, according to certain other embodiments of the present disclosure.

In certain other embodiments (for example as illustrated in FIG. 19), when the base member 134 and the release member 136 are coupled together and in the lock position, the release member 136 is not rotatable within the pocket 162. In this respect, the perimeter 148 of the plate-like body 138 of the release member 136 has an eccentric shape such that the release member 136 is not rotatable in the pocket 162 of the base member 134. The perimeter 148 of the release member 136 may have a shape which is a multi-faceted geometric form. This embodiment of the coupling device 120 may be used when rotation of the equipment 12 is not required. In certain embodiments, the release member 136 further comprises a circular member 206 which is rotatable within the pocket 162 (FIG. 19).

In certain embodiments, the coupling device 120 is further provided with a damping member 208 (FIG. 18) attachable to the back side 154 of the base member 134 and arranged to be positioned between the base member 134 and the surface in use. The damping member 208 is arranged to absorb vibrations and shocks, and/or reduce energy transmission. In certain embodiments, the damping member 208 is made of any suitable material such as elastomeric materials.

In certain embodiments, the base member 134 and the release member 135 embody the base member 12 and the release member 14, respectively, to which the locking mechanism is associated.

Certain embodiments of coupling devices and systems which could be used with the present lockable coupling device 10, are described in U.S. 62/915,806 filed Oct. 16, 2019, U.S. 62/909,408, filed Oct. 2, 2019, U.S. 62/983,075 filed Feb. 28, 2020, and U.S. 63/027,548 filed May 20, 2020, the contents of which are herein incorporated by reference.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented. Examples of changes, substitutions, and alterations are ascertainable by one skilled in the art and could be made without departing from the scope of the information disclosed herein.

It should be expressly understood that various technical effects mentioned throughout the description above need not be enjoyed in each and every embodiment of the present technology. As such, it is anticipated that in some implementations of the present technology, only some of the above-described technical effects may be enjoyed. While in other implementations of the present technology, none of the above enumerated technical effects may be present, while other technical effects not specifically enumerated above may be enjoyed. It should be expressly understood that the above enumerated technical effects are provided for illustration purposes only, to enable those skilled in the art to better appreciate embodiments of the present technology and by no means are provided to limit the scope of the present technology or of the claims appended herein below.

It is noted that the foregoing has outlined some of the more pertinent non-limiting embodiments. It will be clear to those skilled in the art that modifications to the disclosed non-embodiment(s) can be effected without departing from the spirit and scope thereof As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A lockable coupling device for releasably attaching a first item to a second item, the lockable coupling device comprising:

a base member configured to be attachable to the first item, the base member having a front face defining, at least partially, a pocket of the base member;

a release member configured to be attachable to the second item;

the base member being releasably connectable to the release member by interengageable portions, the base member and the release member configurable between:

a coupled configuration in which the base member and the release member are connected to one another, such that at least a portion of the release member is received in the pocket of the base member, at least one of the interengageable portions being positioned within the pocket of the base member, and a release configuration;

a coupling mechanism for permitting actuation between the coupled configuration and the release configuration, the coupling mechanism including an actuator operatively connected to at least one of the interengageable portions and moveable between a first state configured to permit engagement of the interengageable portions in the coupled configuration, and a second state configured to release the engagement of the interengageable portions in the release configuration;

a locking mechanism for locking and releasing the coupled configuration, the locking mechanism comprising:

an operator input portion positioned on the front face of the base member, the operator input portion operatively connected to a latch portion and configured to:

lock the base member and the release member in the coupled configuration by causing the latch portion to engage with the actuator, such that the latch portion interferes with actuation of the actuator from the first state to the second state, and unlock the coupled configuration by permitting movement of the actuator from the first state to the second state.

2. The lockable coupling device of claim 1, wherein the locking mechanism is caused to unlock and/or lock the base member and the release member in the coupled configuration responsive to an input to the operator input portion matching a predetermined input.

3. The lockable coupling device of claim 2, wherein the locking mechanism comprises a security interface through which the input and/or the predetermined input is obtainable.

4. The lockable coupling device of claim 3, wherein the security interface is a combination dial.

5. The lockable coupling device of claim 2, wherein the input and/or the predetermined input comprises one or more of a numerical input, an alphanumeric input, a symbol, a security code, or a security key.

6. The lockable coupling device of claim 2, wherein the operator input portion is configured such that when the input is obtained, a housing of the operator input portion is configured to be rotated to move the latch portion away from the actuator.

7. The lockable coupling device of claim 1, wherein the interengageable portions comprise a tongue member and a rim of an opening in a contact face of the release member, wherein in an extended position of the tongue member, the tongue member extends outwardly from the front face to engage with the rim, and in a retracted position of the tongue member, the tongue member is retracted below the front face to disengage from the rim of the release member.

8. The lockable coupling device of claim 7, wherein the tongue member is resiliently biased towards the extended position, and is configured to be actuated to the retracted position by the actuation of the actuator.

9. The lockable coupling device of claim 1, wherein the base member has:

a contact portion defined by the front face and configured to contact a contact face of the release member;

a shoulder extending around a portion of a periphery of the contact portion to define the pocket for receiving the portion of the release member, the shoulder engageable with a portion of a flange of the release member when the release member is positioned on the base member;

an open access end through which the release member is configured to be slidingly inserted into and removed from the pocket;

a tongue member positioned in a recess within the contact portion and moveable by the coupling mechanism between a first position in which at least a portion of the tongue member extends from the recess and abuts a rim of the release member in the coupled configuration, and a second position in which the tongue member is retracted into the recess;

wherein the tongue member is resiliently biased towards the first position.

10. The lockable coupling device of claim 9, wherein the base member comprises a plurality of spring loaded ball bearings partially extending from recesses formed in the front face of the base member and engageable with corresponding recesses defined in the contact face of the release member.

11. The lockable coupling device of claim 9, wherein the release member comprises a body with a first side and a second side, the first side defining the contact face, and a collar extending from the second side and positioned inwardly of a perimeter of the release member to define the flange.

12. The lockable coupling device of claim 1, further comprising an anti-friction layer attached to the release member.

13. The lockable coupling device of claim 1, further comprising a damping member attachable to a back face of the base member and arranged to be positioned between the base member and a surface in use, the damping member being arranged to absorb vibration and/or shock.

14. The lockable coupling device of claim 1, further comprising a top plate attachable to the release member.

15. The lockable coupling device of claim 1, wherein a perimeter of a body of the release member is circular in shape, a tongue member of the base member is positioned substantially centrally of a contact portion of the base member, and an opening of the release member is positioned substantially centrally of the body of the release member, such that the release member is configured to be rotated within the pocket when the tongue member abuts a rim of the opening of the release member.

16. The lockable coupling device of claim 1, wherein a perimeter of a body of the release member has an eccentric shape such that the release member is not rotatable in the pocket of the base member.

17. A lockable coupling assembly comprising:

a first item having a support surface;

a second item comprising one or more of: medical equipment; a housing for medical equipment; a storage unit; a medicine storage container; a narcotic storage container; or a biohazard container; and a lockable coupling device having:

a base member configured to be attachable to the first item, the base member having a front face defining, at least partially, a pocket of the base member;

a release member configured to be attachable to the second item;

the base member being releasably connectable to the release member by interengageable portions, the base member and the release member configurable between:

a coupled configuration in which the base member and the release member are connected to one another, such that the release member is received in the pocket of the base member, at least one of the interengageable portions being positioned within the pocket of the base member, and a release configuration;

a coupling mechanism for permitting actuation between the coupled configuration and the release configuration, the coupling mechanism including an actuator operatively connected to at least one of the interengageable portions and moveable between a first state configured to permit engagement of the interengageable portions in the coupled configuration, and a second state configured to release the engagement of the interengageable portions in the release configuration;

a locking mechanism for locking and releasing the coupled configuration, the locking mechanism comprising:

an operator input portion positioned on the front face of the base member, the operator input portion operatively connected to a latch portion and configured to:

lock the base member and the release member in the coupled configuration by causing the latch portion to engage with the actuator, such that the latch portion interferes with actuation of the actuator from the first state to the second state, and unlock the coupled configuration by permitting movement of the actuator from the first state to the second state.

18. The lockable coupling assembly of claim 17, wherein the first item is a transportation device.

* * * * *